US008538907B2

(12) United States Patent
Freese et al.

(10) Patent No.: US 8,538,907 B2
(45) Date of Patent: Sep. 17, 2013

(54) AUTONOMOUS INTELLIGENT CONTENT ITEMS

(75) Inventors: Bradley T. Freese, Coppell, TX (US); Tom B. Slade, Denton, TX (US); Mathews Thomas, Flower Mound, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/941,563

(22) Filed: Nov. 8, 2010

(65) Prior Publication Data

US 2012/0117016 A1    May 10, 2012

(51) Int. Cl.
*G06N 5/00* (2006.01)

(52) U.S. Cl.
USPC .............................................. 706/50; 706/45

(58) Field of Classification Search
USPC ..................................... 706/50, 45
See application file for complete search history.

(56) References Cited

U.S. PATENT DOCUMENTS

| 2002/0111956 | A1 | 8/2002 | Yeo et al. |
| 2003/0046274 | A1 | 3/2003 | Erickson et al. |
| 2003/0110272 | A1 | 6/2003 | Du Castel et al. |
| 2007/0083380 | A1 | 4/2007 | Martinez |

OTHER PUBLICATIONS

Decker, et al., Designing Reusable Behaviors for Information Agents, The Robotics Institute, Carnegie-Mellon University, 1996, pp. 1-17.*

Lerman, K. "Wrapper Maintenance: A Machine Learning Approach", Journal of Artificial Intelligence Research, vol. 18, Dec. 31, 2003, pp. 149-181.
Chidlovski, B, "Automatic Repairing of Web Wrappers by Combining Redundant Views", Institute of Electrical and Electronics Engineers, Proceedings of the 14th IEEE International Conference on Tools with Artificial Intelligence, 2002, Washington, DC, Nov. 4, 2002, 8 pages.
Meng, et al, "Schema-Guided Wrapper Maintenance for Web-Data Extraction", ACM 1-58113-725, 2003, 8 pages.
Anonymous: "MultiplatformsCommon Event Infrastructure Version 6.1.0. IBM—WebSphere Process Server for Multiplatforms", Product Overview, IBM Corp., Mar. 31, 2008, 72 pages.
International Search Report for PCT/EP2011/067990 dated Sep. 19, 2012.

* cited by examiner

*Primary Examiner* — Wilbert L Starks
(74) *Attorney, Agent, or Firm* — Patents On Demand P.A.; Brian K. Buchheit; Scott M. Garrett

(57) ABSTRACT

One embodiment of the disclosure provides a storage unit of digitally encoded information stored on a non-transitory storage medium. The storage unit can be referred to as an intelligent content item. The intelligent content item can include an intelligent wrapper, content data, and intelligent functions. The intelligent wrapper can enable the intelligent content item to function as a self-managing unit of storage. The content data can be contained within the intelligent wrapper. The intelligent functions can be contained within the intelligent wrapper. The intelligent functions can represent abilities of the intelligent wrapper to autonomously and dynamically manage a state of the intelligent content item and manage specifics for content consumers to access and utilize the content data.

31 Claims, 4 Drawing Sheets

AUTONOMOUS INTELLIGENT CONTENT ITEMS

BACKGROUND

The present invention relates to the field of data management and, more particularly, to autonomous intelligent content items.

Content managements systems are commonly used to provide library functions (e.g., storage, access, versioning) for a variety of content data. While conventional content management systems provide the structure for handling content data, these systems often require an increasingly larger amount of storage space to house not only the content data, but also the additional data generated as overhead.

As such, conventional content management systems tend to grow to unmanageable sizes. To address this problem, organizations often resort to using multiple content management systems, one for each category or grouping of content data. While this approach helps to alleviate performance issues related to large library sizes, this approach does not provide content consumers (e.g., users, business processes) with an easy means to locate content data; content consumers must know the exact location of the content data ahead of time or waste time searching through the various content management systems.

Further, conventional content management systems are built on the principle of centralized storage. Accessing content data from a conventional content management system takes a variable amount of time, depending on network conditions and how far the content consumer is from the centralized storage space. While this is not a problem for some users, this delay introduces performance inconsistencies to content consumers like business processes/services that function with time constraints.

Conventional content management systems are unable to remedy this situation. Identifying the performance problem is a manual and laborious process. Relocating the content data would alleviate some of the inconsistencies, but is not allowed for content data managed under centralized storage.

BRIEF SUMMARY

One aspect of the disclosure provides a storage unit of digitally encoded information stored on a non-transitory storage medium. The storage unit can be referred to as an intelligent content item. The intelligent content item can include an intelligent wrapper, content data, and intelligent functions. The intelligent wrapper can enable the intelligent content item to function as a self-managing unit of storage. The content data can be contained within the intelligent wrapper. The intelligent functions can be contained within the intelligent wrapper. The intelligent functions can represent abilities of the intelligent wrapper to autonomously and dynamically manage a state of the intelligent content item and manage specifics for content consumers to access and utilize the content data.

One aspect of the disclosure provides a system for managing distributed content. The system can include a plurality of intelligent content items and a common event messaging infrastructure (CEMI). Each of the intelligent content items can be a storage unit stored in a storage medium. Each intelligent content item can include an intelligent wrapper enabling the intelligent content item to function as a self-managing unit of storage and content data contained within the intelligent wrapper. The common event messaging infrastructure (CEMI) can comprise hardware and software components configured to receive and distribute event messages among the different content consumers and the intelligent content items.

One aspect of the disclosure provides a method, a computer program product, and a system for handling storage units of digitally encoded content. In the aspect, a set of intelligent content items can be identified, where each intelligent content item is a storage unit stored in a storage medium. Each intelligent content item can comprise an intelligent wrapper enabling the intelligent content item to function as a self-managing unit of storage and content data contained within the intelligent wrapper. As each of the intelligent content items is utilized by a set of content consumers, usage behavior related to each of the intelligent content items can be recorded within usage data that is stored within the intelligent wrapper of the related intelligent content item. Each of the intelligent content items can trigger at least one self-managing function defined within the intelligent wrapper based on changes to the recorded usage behavior. The self-managing function can cause the corresponding intelligent content item to change a format of the content data contained in the intelligent content item, to compress a rarely used portion of the content data contained in the intelligent content item while keeping a different portion of the content data uncompressed, and/or to detect at least a portion of the data content that is being misused by a content consumer and to automatically delete the detected portion of the data content from the corresponding intelligent content item.

DETAILED DESCRIPTION

Figure 1:
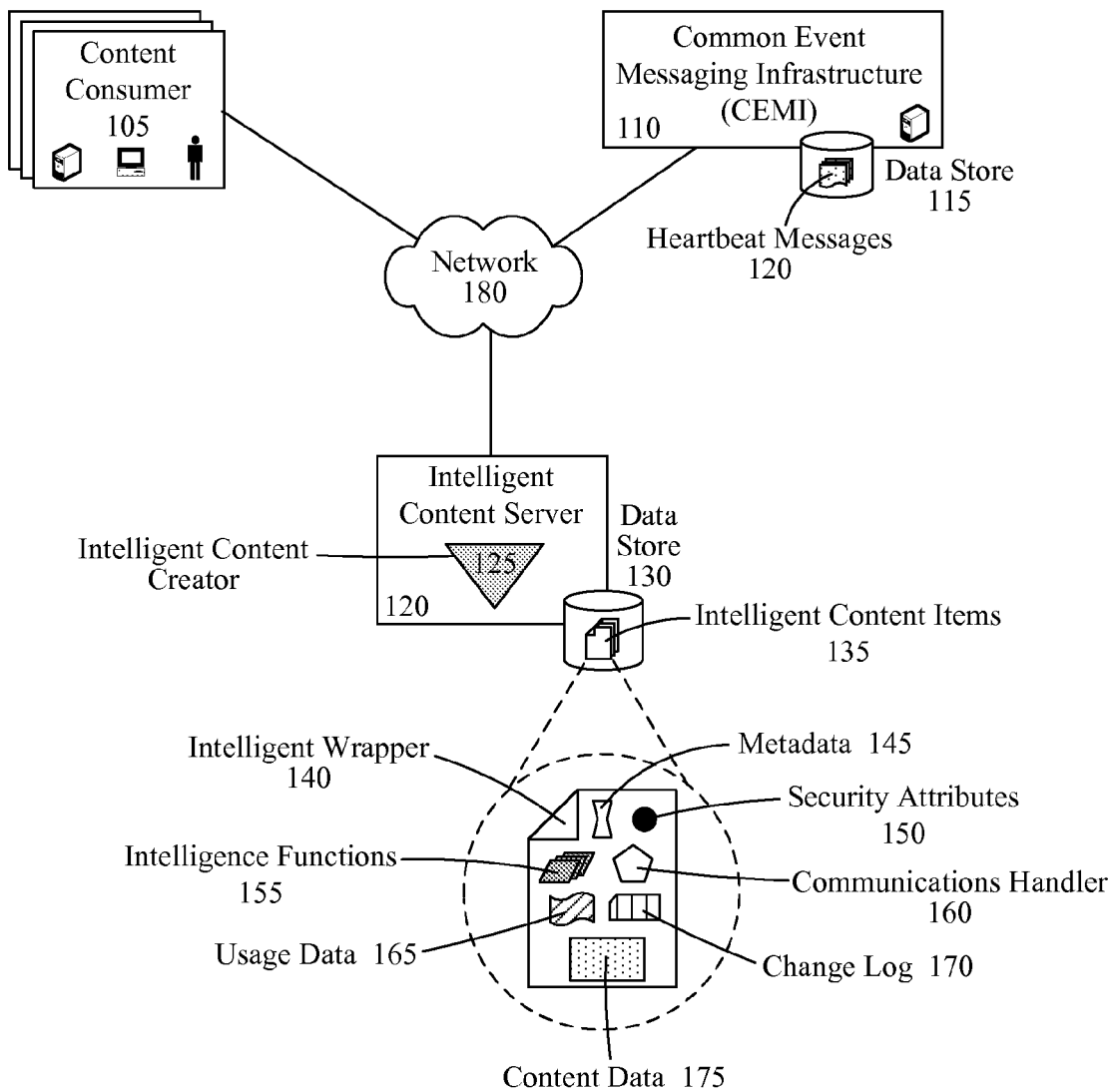
FIG. 1 is a schematic diagram illustrating a system that provides intelligent content items in accordance with embodiments of the inventive arrangements disclosed herein.

The present invention discloses a solution that provides intelligent content management functionality at the content data-level. An element of content data can be coupled to an intelligent wrapper to create an intelligent content item. The intelligent wrapper can be configured to capture usage data for the content data and execute a variety of intelligence functions designed to improve access of the content data by content consumers. The intelligent content item can utilize a common event messaging infrastructure (CEMI) to handle event broadcasting to content consumers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be understood that the above paragraphs can pertain to and include such devices that are externally mounted to a computer and pertain to the present disclosure, such as playback devices and tape devices (e.g., a Video Cassette Recorder or a Digital Video Recorder), as well as externally or remotely attachable or mountable storage devices such as hard disk drives, Virtual Tape drives and other such devices.

FIG. 1 is a schematic diagram illustrating a system 100 that provides intelligent content items 135 in accordance with embodiments of the inventive arrangements disclosed herein. In system 100, the intelligent content items 135 can be utilized by various content consumers 105 using a common event messaging infrastructure (CEMI) 110 and network 180.

A content consumer 105 can represent a variety of entities that request/utilize the content data 175 represented by an intelligent content item 135. Examples of content consumers 105 can include, but are not limited to, human users, business processes, software applications, computing systems, and the like.

The CEMI 110 can represent the hardware and/or software components required to manage the distribution of events for event-based computing systems and/or applications. The CEMI 110 can be configured to receive and/or distribute event messages among the content consumers 105, the intelligent content server 120, and the intelligent content items 135.

The intelligent content server 120 can represent the hardware and/or software components that support storage and access of the intelligent content items 135. The intelligent content server 120 can include an intelligent content creator 125 and a data store 130 for housing the intelligent content items 135.

The intelligent content creator 125 can represent a software application configured to perform functions associated with the creation of intelligent content items 135. The functionality of the intelligent content creator 125 can be invoked by actions and/or events initiated by content consumers 105.

For example, a business process 105 that converts an electronic copy of a book into the appropriate data format for e-reader devices can, at the end of the conversion, invoke the intelligent content creator 125 to store the converted book as an intelligent content item 135.

An intelligent content item 135 can represent a compound data storage configuration capable of self-management. The intelligent content item 135 can be comprised of an intelligent wrapper 140 and an item of content data 175. Functions of the intelligent content creator 125 can include the creation of the intelligent wrapper 140 and coupling the intelligent wrapper 140 to the content data 175.

The content data 175 can represent an electronic data file conforming to a standardized encoding format (e.g., a .DOC file, a .MP3 file, a .AVI file, a .JPG file, etc.). The intelligent wrapper 140 can represent the framework that implements the self-management capabilities for the corresponding content data 175. That is, the intelligent wrapper 140 can monitor how the content data 175 is used by various content consumers 105, then determine and initiate changes in order to improve accessibility of the content data 175.

For example, the intelligent wrapper 140 of an intelligent content item 135 can identify that content consumers 105 frequently requests a data format other than the format the content data 175 is currently stored. The intelligent wrapper 140 can then issue an event that requests that the content data 175 be converted to or a copy be made in the other data format.

In addition to the content data 175, the intelligent wrapper 140 can include metadata 145, security attributes 150, intelligence functions 155, a communications handler 160, usage data 165, and a change log 170. The metadata 145 can represent various high-level data values describing the contained content data 175. For example, the metadata 145 can capture when the intelligent content item 135 was created, versioning information of the content data 175, keyword tags, the file type and size of the content data 175, and the like.

The capture and addition of the metadata 145 can be a function of the intelligent content creator 125 during creation of the intelligent content item 135 or can be performed by the intelligent wrapper 140 after creation. The metadata 145 can offer content consumers 105 details about the content data 175 prior to issuing an access request.

For example, a content consumer 105 can query the metadata 145 of the library of intelligent content items 135 to generate a listing of content data 175 having the same keyword tag.

Security attributes 150 can be used to express access restrictions for the content data 175. The intelligent wrapper 140 can assess incoming requests from content consumers 105 and/or the CEMI 110 against the security attributes 150 to determine if and/or how the content data 175 is to be provided. For example, an access request from an unknown content consumer 105 can be automatically rejected or can be provided with only a portion of the content data 175 (i.e., the first ten seconds of a video file). It should be noted that other systems such as the security system with its associated attributes can be contained within the intelligent wrapper 140.

In another embodiment, security functions performed by the intelligent wrapper 140 using the security attributes 150 can be handled by an external security server (not shown). Additional systems such as but other than security systems can be utilized and incorporated in this distributed model.

The intelligence functions 155 can represent the abilities of the intelligent wrapper 140 to autonomously and dynamically manage the state of the intelligent content item 135 as a whole or only the content data 175 in response to how the intelligent content item 135 is being used by content consumers 105. Thus, changes are made to an intelligent content item 135 or content data 175 only when warranted by its use.

It should be emphasized that each intelligent content item 135 operates independent of each other. That is, changes made to intelligent content item A 135 can reflect how intelligent content item A 135 has been used and will not be applied to any other intelligent content item 135.

Since changes to the intelligent content item 135 are based upon use, an intelligence function 155 can be configured to capture usage data 165. The usage data 165 can comprise a variety of information that describe the requests made of the intelligent content item 135 as well as any subsequent actions required to fulfill the requests.

For example, when a request is made for a different data format, the usage data 165 can capture details about the requesting content consumer 105 and that the content data 175 required a data conversion.

Other intelligence functions 155 can utilize the usage data 165 to perform other operations, such as data analysis. Building upon the above example, in one embodiment, an intelligence function 155 can identify that the content data 175 stored in the portable network graphics (PNG) format is requested in the joint photographics expert group (JPEG) format 70% of the time. From this data analysis an intelligence function 155 can determine that more time and resources would be saved if the content data 175 was stored as JPEG instead of PNG. It should be noted that this type of conversion is not limited to the example above and can be utilized for other media type conversions, such as from a .AVI file to .MP4 file when usage data indicates .MP4 to be the preferred requested format.

Additionally, the usage data 165 can be requested for use by content consumers 105. For example, a business process 105 can request the usage data 165 of an intelligent content item 135 to determine audiences for marketing efforts.

When a change is made to the intelligent content item 135 or content data 175 by an intelligence function 155 or content consumer 105, the intelligence functions 155 can record this change in the state of the intelligent content item 135 in the change log 170. Like the usage data 165, the contents of the change log 170 can be used for data analysis and other operations performed by the intelligence functions 155.

An intelligence function 155 can also be configured to periodically broadcast presence information to the CEMI 110 in the form of heartbeat messages 118. A heartbeat message 118 can be used to provide a brief description of the intelligent content item 135 to indicate its existence. For example, a heartbeat message 118 can include the name and location of the intelligent content item 135.

The CEMI 110 can be configured to retain the most current heartbeat message 118 of an intelligent content item 135 in a data store 115. The heartbeat messages 118 stored by the CEMI 110 can represent a dynamic listing of available intelligent content items 135 that can be used by content consumers 105 prior to requesting the content data 175. When an intelligent content item 135 is no longer available (i.e., inactive or deleted), the CEMI 110 will no longer receive a heartbeat message 118 and can delete the outdated heartbeat message 118.

It should be noted that the use of heartbeat messages 118 can reduce the need for the intelligent content items 135 to be stored in a single, central location as common in many conventional content management systems. Intelligent content items 135 can be stored in locations deemed best by their intelligence functions 155 and usage data 165. The heartbeat messages 118 can keep the CEMI 110, and therefore any content consumers 105, abreast of the location of each intelligent content item 135.

For example, an intelligence function 155 may determine that it would be more efficient to store the intelligent content item 135 closer to the content consumers 105 that request it most frequently. After the intelligent content item 135 has been relocated, its subsequent heartbeat messages 118 will reflect the change in location.

The communications handler 160 can represent the component of the intelligent wrapper 140 configured to manage communication-related tasks like the composition of events sent to the CEMI 110. For example, an intelligence function 155 can determine that the content data 175 should be converted to another data format and pass the pertinent information to the communications handler 160. The communications handler 160 can then compose the appropriate event message in accordance with the standard used by the CEMI 110.

In another embodiment, the heartbeat message 118 or any message emitted by the Intelligent Content Server can be tracked and kept by an external system as an alternative to the CEMI. This external system can perform the functions of the CEMI as described in reference to the heartbeat messages 118.

As used herein, presented data stores 115 and 130 can be a physical or virtual storage space configured to store digital information. Data stores 115 and 130 can be physically implemented within any type of hardware including, but not limited to, a magnetic disk, an optical disk, a semiconductor memory, a digitally encoded plastic memory, a holographic memory, or any other recording medium. Data stores 115 and 130 can be a stand-alone storage unit as well as a storage unit formed from a plurality of physical devices. Additionally, information can be stored within data stores 115 and 130 in a variety of manners. For example, information can be stored within a database structure or can be stored within one or more files of a file storage system, where each file may or may not be indexed for information searching purposes. Further, data stores 115 and/or 130 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
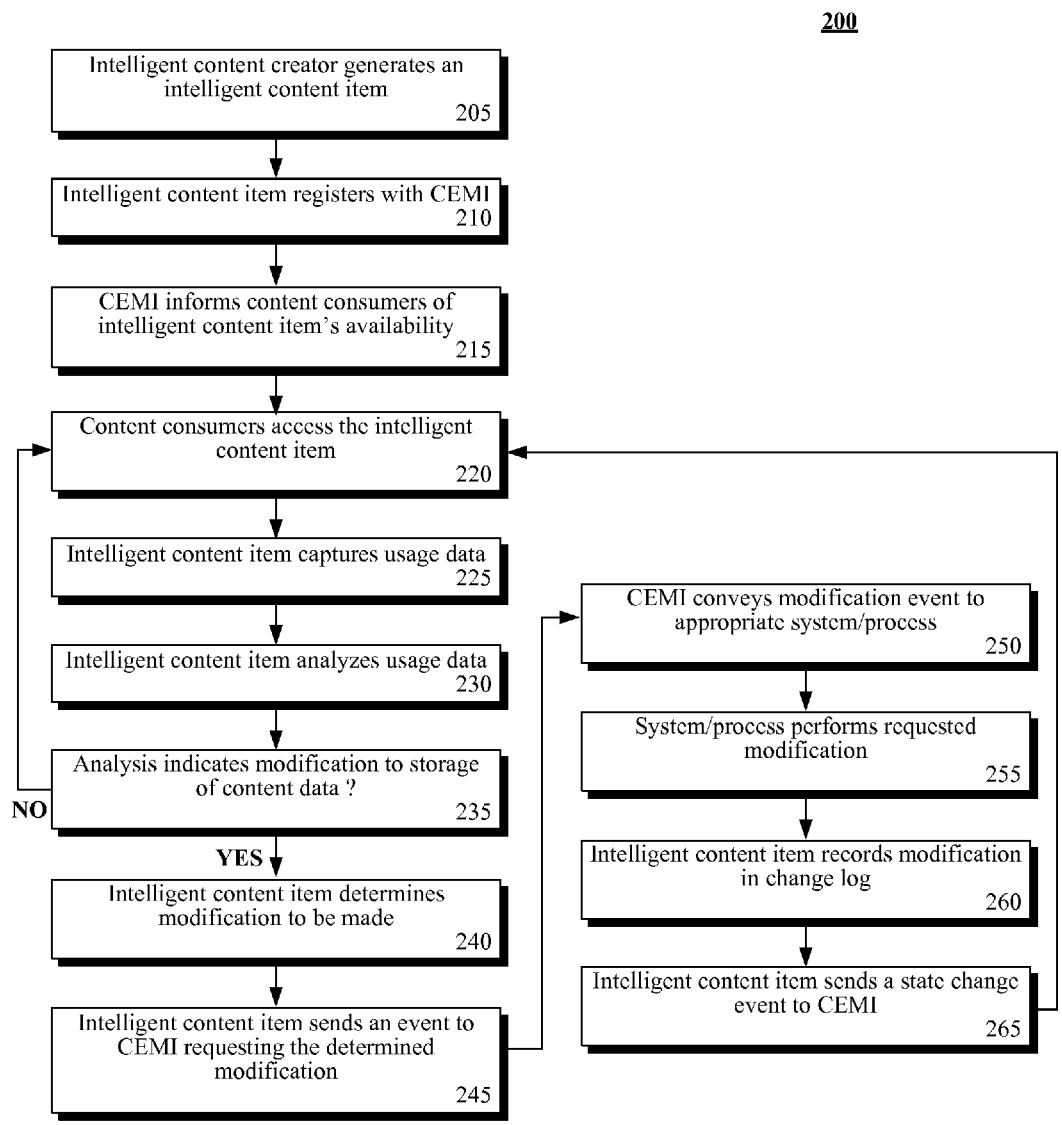
FIG. 2 is a flow chart of a method describing the basic interactions between intelligent content items, the CEMI, and content consumers in accordance with an embodiment of the inventive arrangements disclosed herein.
Figure 3:
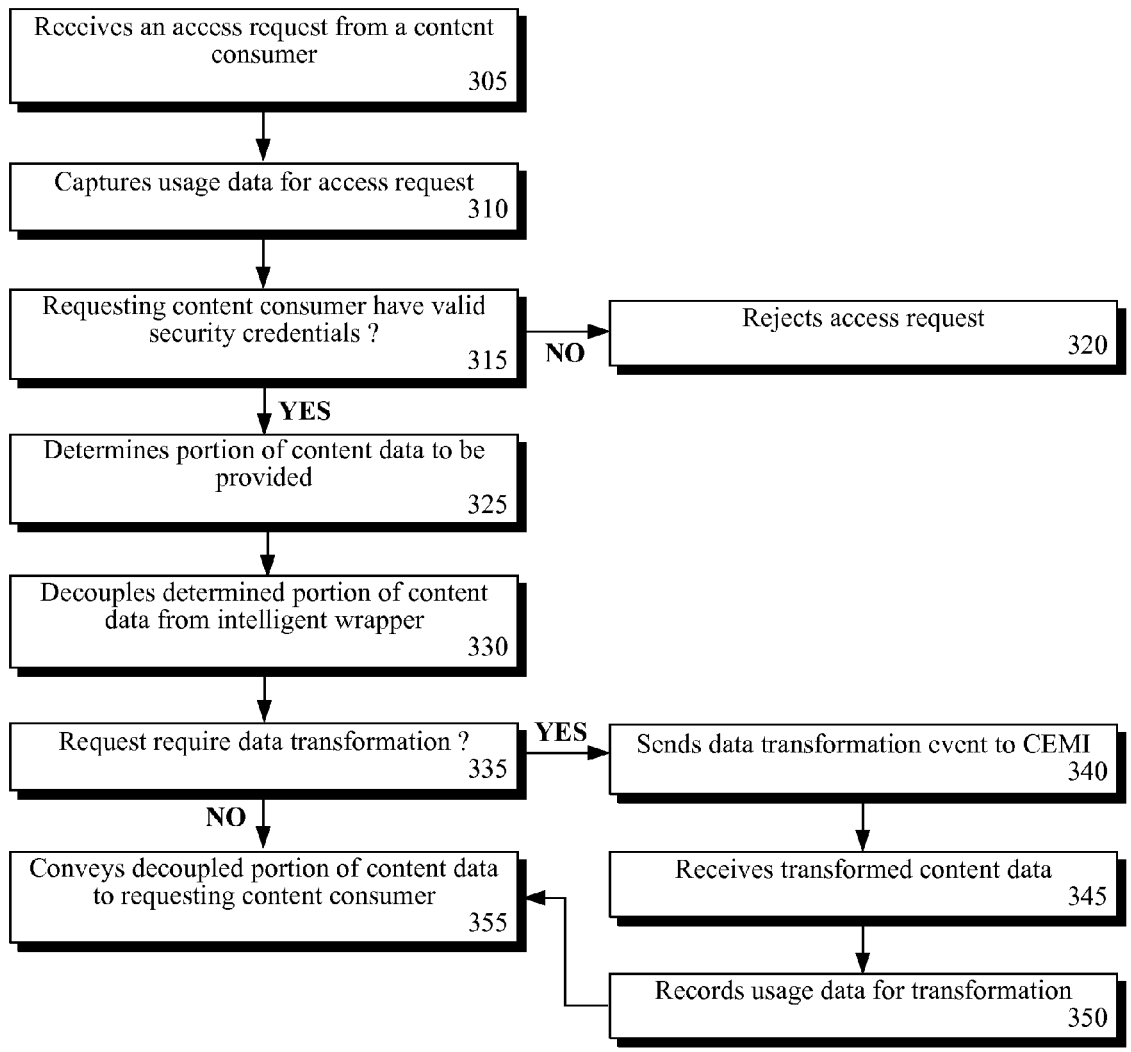
FIG. 3 is a flow chart of a method illustrating the handling of content data access by the intelligent wrapper of the intelligent content item in accordance with an embodiment of the inventive arrangements disclosed herein.
Figure 4:
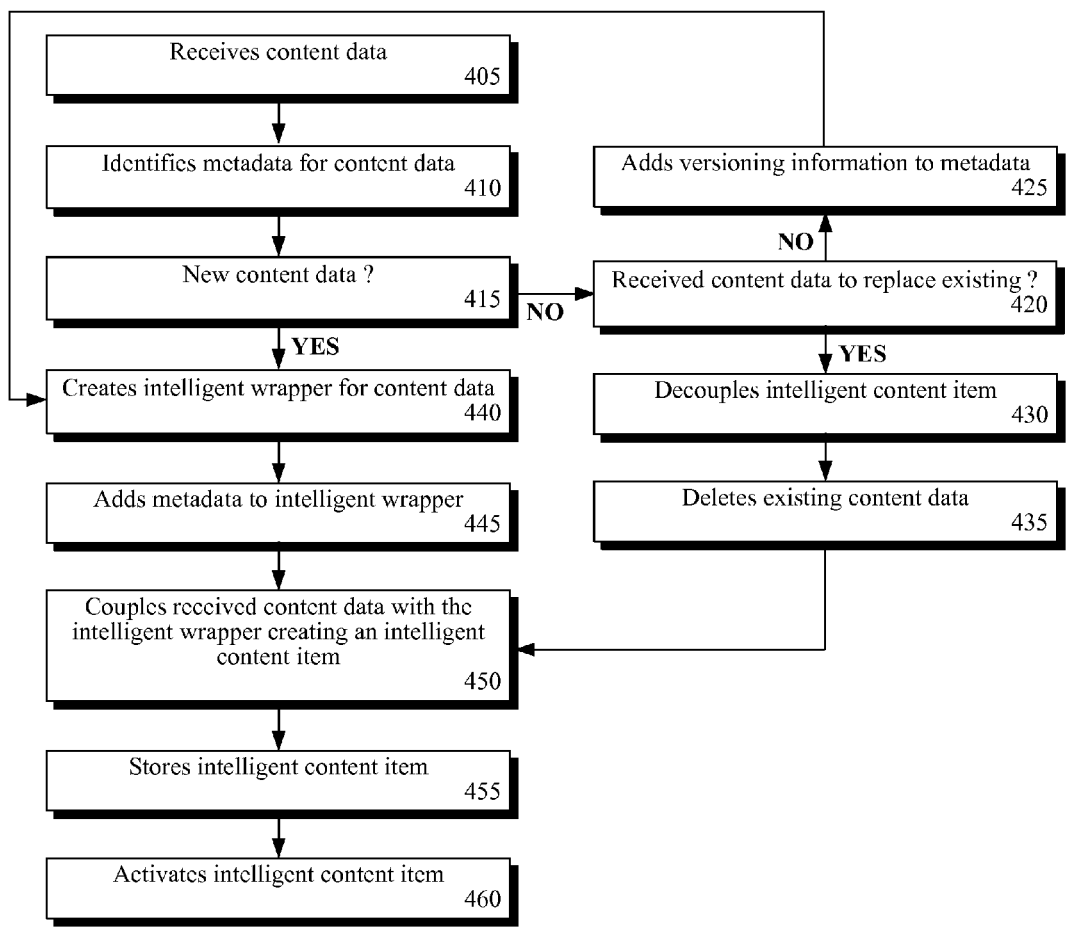
FIG. 4 is a flow chart of a method describing the creation of an intelligent content item by an intelligent content creator in accordance with embodiments of the inventive arrangements disclosed herein.

FIG. 2 through FIG. 4 are flow charts of methods in accordance with an embodiment of the disclosure. These flows are for illustrative purposes and the disclosure is not limited to the information and/or steps contained in these flows. Other methods concerning intelligent content items, their creation, updating, deletion, access criteria and interactions with external systems are contemplated.

FIG. 2 is a flow chart of a method 200 describing the basic interactions between intelligent content items, the CEMI, and content consumers in accordance with embodiments of the inventive arrangements disclosed herein. Method 200 can be performed within the context of system 100 and/or another system supporting autonomous intelligent content items.

Method 200 can begin in step 205 where the intelligent content creator can generate an intelligent content item. The intelligent content item can register with the CEMI in step 205. Step 205 can represent the sending of the first heartbeat message from the intelligent content item to the CEMI.

In step 215, the CEMI can inform content consumers of the availability of the intelligent content item. Step 215 can utilize the subscribe functionality inherent within the CEMI. Content consumers can then access the intelligent content item in step 220. It should be noted that only users with appropriate rights will be able to gain access to the intelligent content item; an authorization check can be performed during step 220 similar to step 315 as described later.

In step 225, the intelligent content item can capture usage data. The captured usage data can be analyzed by the intelligent content item in step 230. In step 235, the intelligent content item can determine if the analysis performed in step 230 indicates that the storage of the content data should be modified.

It should be noted that the analysis in step 230 can impact more than simply storage of data. For example, the content may need to be accessed by a system but requires the content to be transcoded first. Subsequently, the container could then invoke a transcoder. In another embodiment, additional functionality of the data analysis in step 230 can concern self monitoring: Assume the data in question can be a very large piece of media content and analysis can indicate that a certain portion is always accessed. The intelligence function 155 can take this into account the next time content is requested and so can update its record so that above commonly accessed data is cached, etc.).

When modification of the content data is not indicated, flow of method 200 can return to step 220 where the intelligent content item can continue to monitor its usage. When modification of the content data is indicated, the intelligent content item can determine the modification to be made in step 240.

In step 245, the intelligent content item can send an event to the CEMI requesting the determined modification. The CEMI can convey the modification event to the appropriate system or process in step 250. In step 255, the system or process can perform the requested modification.

The intelligent content item can record the modification made by the system or process in its change log in step 260. In step 265, the intelligent content item can send a state change event to the CEMI. From step 265, flow of method 200 can return to step 220 where the intelligent content item can continue to monitor its usage.

FIG. 3 is a flow chart of a method 300 illustrating the handling of content data access by the intelligent wrapper of the intelligent content item in accordance with embodiments of the inventive arrangements disclosed herein. Method 300 can be performed by system 100 in conjunction with method 200.

Method 300 can begin in step 305 where the intelligent content item can receive an access request from a content consumer. Usage data regarding the access request can be captured by the intelligent wrapper in step 310. In step 315, it can be determined if the requesting content consumer has valid security credentials.

When the requesting content consumer does not have valid security credentials, step 320 can execute where the intelligent wrapper can reject the access request. The requesting content consumer can be provided with notification of the rejection as part of step 320.

When the requesting content consumer possesses valid security credentials, the portion of the content data to be provided to the content consumer can be determined in step 325. Depending upon how security and/or access privileges are implemented, valid security credentials can still contain varying levels of provided access.

For example, in an electronic media Internet store, a user of a gold status level with valid security credentials can be provided the content data in its entirety, whereas a user having a silver status level with valid security credentials may be provided with only the first half of the content data.

In step 330, the determined portion of the content data can be decoupled from the intelligent wrapper, such that a copy of the determined portion of the content data can be made available to the requester. The need for the content data to undergo a data transformation to fulfill the request can be determined in step 335. When data transformation is not required, step 355 can execute where the copy of the portion of content data can be conveyed to the requesting content consumer.

When data transformation is required, a data transformation event can be sent to the CEMI in step 340. In step 345, the intelligent content item can then receive the transformed content data. Usage data regarding the data transformation can be recorded in step 350.

FIG. 4 is a flow chart of a method 400 describing the creation of an intelligent content item by an intelligent content creator in accordance with embodiments of the inventive arrangements disclosed herein. Method 400 can be performed in the context of system 100 in conjunction with methods 200 and/or 300.

Method 400 can begin in step 405 where the intelligent content creator can receive content data. Metadata can be identified for the content data in step 410. In step 415, it can be determined if the received content data is new (i.e., not a new version of an existing intelligent content item).

When the received content data is new, step 440 can execute where an intelligent wrapper can be created for the content data. The metadata can be added to the intelligent wrapper in step 445. In step 450, the received content data can be coupled with the intelligent wrapper to create the intelligent content item.

The intelligent content item can then be stored in step 455. In step 460, the intelligent content item can be activated. Activation of the intelligent content item can correspond to initializing the intelligence functions of the intelligent content item.

When the received content data is not new, flow of method 400 can flow from step 415 to step 420 where it can be determined if the received content data is to replace the existing content data. When the received content data is not to replace the existing content data (i.e., a separate version of the content data), versioning information can be added to the metadata in step 425. In step 427, the system can optionally broadcast messages informing interested parties of the event having occurred in step 425. From step 427, or directly from step 425, flow of method 400 can proceed to step 440 where the content data can be made into an intelligent content item.

When the existing content data is to be replaced, the intelligent content item can be decoupled into its content data and intelligent wrapper in step 430. In step 435, the existing content data can be deleted. Following the deletion, in step 437, the system can optionally broadcast messages informing interested parties of the event having occurred in step 435. From step 437, or directly from step 435, method 400 can flow to step 450 and progress accordingly.

It should be noted that in this occurance of step 450, the received content data is coupled not to a new intelligent wrapper, but the intelligent wrapper from the existing intelligent content item.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A storage unit of digitally encoded information stored on a non-transitory storage medium, said storage unit being referred to as an intelligent content item, said storage unit comprising:
    an intelligent wrapper, stored on at least one non-transitory storage medium, enabling the intelligent content item to function as a self-managing unit of storage;
    content data, stored on at least one non-transitory storage medium, contained within the intelligent wrapper; and
    intelligent functions, specified by program instructions executable by one or more processors, contained within the intelligent wrapper, wherein said intelligent functions represent abilities of the intelligent wrapper to autonomously and dynamically manage a state of the intelligent content item and manage specifics for content consumers to access and utilize the content data, wherein the intelligent functions trigger at least one action to be performed by one or more machines responsive to changes in user behavior, which is recorded within the intelligent wrapper, wherein said at least one action is selected from a group of actions consisting of:
        one or more machines changing a format of the content data contained in the intelligent content item;
        one or more machines compressing a rarely used portion of the content data contained in the intelligent content item while keeping a different portion of the content data uncompressed; and
        one or more machines detecting at least a portion of the data content that is being misused by a content consumer and to automatically delete the detected portion of the data content from the corresponding intelligent content item.

2. The storage unit of claim 1, further comprising:
    a communication handler, specified by program instructions executable by one or more processors, contained within the intelligent wrapper configured to manage communication activities of the intelligent content item, which includes the communication of events between the intelligent content item and a common event messaging infrastructure (CEMI) and communication of heartbeat messages from the intelligent content item to the common event messaging infrastructure (CEMI).

3. The storage unit of claim 1, further comprising:
    usage data, stored on at least one non-transitory medium, for the content data contained within the intelligent wrapper, wherein said usage data comprises a variety of information that describes requests made of the intelligent content item as well as subsequent actions required to fulfill the requests, wherein the usage data values trigger automatic specific ones of the intelligent functions.

4. The storage unit of claim 1, further comprising:
security attributes contained within the intelligent wrapper, wherein said security attributes specify access restrictions for the content data.

5. The storage unit of claim 1, further comprising:
a change log contained within the intelligent wrapper, which records changes of state of the content data, times these changes were made, and content consumers that made the changes.

6. The storage unit of claim 1, further comprising:
metadata contained within the intelligent wrapper, wherein said metadata specifies when the intelligent content item was created, versioning information of the content data, keyword tags, a file type of the content data, and a size of the content data.

7. The storage unit of claim 1, wherein the intelligent content item is configured to be utilized by a plurality of different content consumers using a common event messaging infrastructure (CEMI), wherein the CEMI comprises hardware and software components configured to receive and distribute event messages among the different content consumers and a plurality of the intelligent content items, wherein said intelligent content items are distributed across a networked computing space and wherein the intelligent content items comprise said intelligent content item.

8. The storage unit of claim 1, wherein the intelligent functions comprise:
a function that changes a format of the content data to a format requested by content consumer;
a function that performs data analysis for the intelligent content item; and
a function to broadcast presence information of the intelligent content item to a common event messaging infrastructure (CEMI).

9. The storage unit of claim 1, wherein at least a portion of the intelligent functions of the intelligent content item change the content data based on usage data, wherein the usage data is maintained within the intelligent wrapper.

10. A system for managing distributed content comprising:
a plurality of intelligent content items, each being a storage unit stored in a storage medium, each intelligent content item comprising an intelligent wrapper enabling the intelligent content item to function as a self-managing unit of storage and content data contained within the intelligent wrapper; and
a common event messaging infrastructure (CEMI), wherein the CEMI comprises hardware and software components configured to receive and distribute event messages among the different content consumers and the plurality of the intelligent content items.

11. The system of claim 10, wherein each of the intelligent content items further comprises:
a communication handler contained within the intelligent wrapper configured to manage communication activities of the intelligent content item, which includes the communication of events between the intelligent content item and a common event messaging infrastructure (CEMI) and communication of heartbeat messages from the intelligent content item to the common event messaging infrastructure (CEMI); and
intelligent functions contained within the intelligent wrapper, wherein said intelligent functions represent abilities of the intelligent wrapper to autonomously and dynamically manage a state of the intelligent content item and manage specifics for content consumers to access and utilize the content data.

12. The system of claim 11, wherein each of the intelligent content items further comprises:
usage data for the content data contained within the intelligent wrapper, wherein said usage data comprises a variety of information that describes requests made of the intelligent content item as well as subsequent actions required to fulfill the requests, wherein the usage data values trigger automatic specific ones of the intelligent functions;
security attributes contained within the intelligent wrapper, wherein said security attributes specify access restrictions for the content data;
a change log contained within the intelligent wrapper, which records changes of state of the content data, times these changes were made, and content consumers that made the changes; and
metadata contained within the intelligent wrapper, wherein said metadata specifies when the intelligent content item was created, versioning information of the content data, keyword tags, a file type of the content data, and a size of the content data.

13. The system of claim 10, further comprising:
an intelligent content server comprising hardware and software components that support storage and access to the plurality of intelligent content items, wherein said intelligent content server is remotely located from the common event messaging infrastructure (CEMI).

14. The system of claim 10, wherein each of the content consumers is remotely located from the plurality of intelligent content items and from the common event messaging infrastructure (CEMI), wherein each of the content consumers is able to invoke each function of the intelligent wrapper.

15. The system of claim 10, further comprising:
a plurality of devices for consuming and utilizing the intelligent content items—intelligence functions of the wrapper are able to be processed by any of the devices.

16. The system of claim 10, wherein each of the intelligent content items operates independent of each other, and wherein each of the intelligent content items is able to autonomously and dynamically perform a set of functions as defined by the intelligent wrapper.

17. A method for handling storage units of digitally encoded content comprising:
at least one computing device identifying a plurality of intelligent content items, each being a storage unit stored in a storage medium, each intelligent content item comprising an intelligent wrapper enabling the intelligent content item to function as a self-managing unit of storage and content data contained within the intelligent wrapper, wherein the intelligent wrapper is stored on a non-transitory storage medium;
as each of the intelligent content items is utilized by a set of content consumers, at least one computing device recording usage behavior related to each of the intelligent content items within usage data that is stored within the intelligent wrapper of the related intelligent content item; and
each of the intelligent content items triggering at least one computing device to perform at least one self-managing function defined within the intelligent wrapper based on changes to the recorded usage behavior, wherein said at least one self-managing function causes the corresponding intelligent content item to perform at least one of:

changing a format of the content data contained in the intelligent content item;
compressing a rarely used portion of the content data contained in the intelligent content item while keeping a different portion of the content data uncompressed; and
detecting at least a portion of the data content that is being misused by a content consumer and to automatically delete the detected portion of the data content from the corresponding intelligent content item.

18. The method of claim 17, wherein different ones of the intelligent content items perform the following self-management functions responsive to the recorded usage behavior:
changing a format of the content data contained in the intelligent content item;
compressing a rarely used portion of the content data contained in the intelligent content item while keeping a different portion of the content data uncompressed; and
detecting at least a portion of the data content that is being misused by a content consumer and to automatically delete the detected portion of the data content from the corresponding intelligent content item.

19. The method of claim 17, wherein said at least one self-managing function causes the corresponding intelligent content item to change a format of the content data contained in the intelligent content item.

20. The method of claim 17, wherein said at least one self-managing function causes the corresponding intelligent content item to compress a rarely used portion of the content data contained in the intelligent content item while keeping a different portion of the content data uncompressed.

21. The method of claim 17, wherein said at least one self-managing function causes the corresponding intelligent content item to detect at least a portion of the data content that is being misused by a content consumer and to automatically delete the detected portion of the data content from the corresponding intelligent content item.

22. The method of claim 17, wherein each of the intelligent content items comprises:
an intelligent wrapper enabling the intelligent content item to function as a self-managing unit of storage;
content data contained within the intelligent wrapper; and
intelligent functions contained within the intelligent wrapper, wherein said intelligent functions represent abilities of the intelligent wrapper to autonomously and dynamically manage a state of the intelligent content item and manage specifics for content consumers to access and utilize the content data.

23. The method of claim 22, wherein each of the intelligent content items comprises:
a communication handler contained within the intelligent wrapper configured to manage communication activities of the intelligent content item, which includes the communication of events between the intelligent content item and a common event messaging infrastructure (CEMI) and communication of heartbeat messages from the intelligent content item to the common event messaging infrastructure (CEMI);
intelligent functions contained within the intelligent wrapper, wherein said intelligent functions represent abilities of the intelligent wrapper to autonomously and dynamically manage a state of the intelligent content item and manage specifics for content consumers to access and utilize the content data;
usage data for the content data contained within the intelligent wrapper, wherein said usage data comprises a variety of information that describes requests made of the intelligent content item as well as subsequent actions required to fulfill the requests, wherein the usage data values trigger automatic specific ones of the intelligent functions;
security attributes contained within the intelligent wrapper, wherein said security attributes specify access restrictions for the content data;
a change log contained within the intelligent wrapper, which records changes of state of the content data, times these changes were made, and content consumers that made the changes; and
metadata contained within the intelligent wrapper, wherein said metadata specifies when the intelligent content item was created, versioning information of the content data, keyword tags, a file type of the content data, and a size of the content data.

24. The method of claim 17, wherein said at least one self-managing function causes the corresponding intelligent content item to change a format of the content data contained in the intelligent content item.

25. The method of claim 17, wherein said at least one self-managing function causes the corresponding intelligent content item to compress a rarely used portion of the content data contained in the intelligent content item while keeping a different portion of the content data uncompressed.

26. The method of claim 17, wherein said at least one self-managing function causes the corresponding intelligent content item to detect at least a portion of the data content that is being misused by a content consumer and to automatically delete the detected portion of the data content from the corresponding intelligent content item.

27. A computer program product comprising a computer readable storage medium having computer usable program code embodied therewith, the computer usable program code comprising:
computer usable program code stored in a non-transitory storage medium which when run by a processor is operable to identify a plurality of intelligent content items, each being a storage unit stored in a storage medium, each intelligent content item comprising an intelligent wrapper enabling the intelligent content item to function as a self-managing unit of storage and content data contained within the intelligent wrapper;
computer usable program code stored in a non-transitory storage medium which when run by a processor is operable to, as each of the intelligent content items is utilized by a set of content consumers, record usage behavior related to each of the intelligent content items within usage data that is stored within the intelligent wrapper of the related intelligent content item; and
computer usable program code stored in a non-transitory storage medium which when run by a processor is operable to, trigger at least one self-managing function defined within the intelligent wrapper based on changes to the recorded usage behavior for each of the intelligent content items, wherein said at least one self-managing function causes the corresponding intelligent content item to perform at least one of:
changing a format of the content data contained in the intelligent content item;
compressing a rarely used portion of the content data contained in the intelligent content item while keeping a different portion of the content data uncompressed; and
detecting at least a portion of the data content that is being misused by a content consumer and to automatically delete the detected portion of the data content from the corresponding intelligent content item.

28. The computer program product of claim 27, wherein said at least one self-managing function causes the corresponding intelligent content item to change a format of the content data contained in the intelligent content item.

29. The computer program product of claim 27, wherein said at least one self-managing function causes the corresponding intelligent content item to compress a rarely used portion of the content data contained in the intelligent content item while keeping a different portion of the content data uncompressed.

30. The computer program product of claim 27, wherein said at least one self-managing function causes the corresponding intelligent content item to detect at least a portion of the data content that is being misused by a content consumer and to automatically delete the detected portion of the data content from the corresponding intelligent content item.

31. A system comprising:
   one or more processors;
   one or more non-transitory storage mediums storing computer usable program code executed by the one or more processors;
   at least a subset of the computer usable program code when executed by the one or more processors is operable to identify a plurality of intelligent content items, each being a storage unit stored in a storage medium, each intelligent content item comprising an intelligent wrapper enabling the intelligent content item to function as a self-managing unit of storage and content data contained within the intelligent wrapper;
   at least a subset of the computer usable program code when executed by the one or more processors is operable to, as each of the intelligent content items is utilized by a set of content consumers, record usage behavior related to each of the intelligent content items within usage data that is stored within the intelligent wrapper of the related intelligent content item; and
   when executed by the one or more processors is operable to trigger at least one self-managing function defined within the intelligent wrapper based on changes to the recorded usage behavior for each of the intelligent content items, wherein said at least one self-managing function causes the corresponding intelligent content item to perform at least one of:
      changing a format of the content data contained in the intelligent content item;
      compressing a rarely used portion of the content data contained in the intelligent content item while keeping a different portion of the content data uncompressed; and
      detecting at least a portion of the data content that is being misused by a content consumer and to automatically delete the detected portion of the data content from the corresponding intelligent content item.

* * * * *